United States Patent

Lundgreen

[15] 3,651,345

[45] Mar. 21, 1972

[54] VOLTAGE VARIABLE PULSE DELAY MONOSTABLE MULTIVIBRATOR

[72] Inventor: Michael W. Lundgreen, Cedar Rapids, Iowa

[73] Assignee: Collins Radio Company, Cedar Rapids, Iowa

[22] Filed: May 25, 1967

[21] Appl. No.: 641,213

[52] U.S. Cl. ..............................307/273, 307/265, 307/293, 328/63, 328/207

[51] Int. Cl. ..............................H03k 3/10

[58] Field of Search ..................307/273, 293, 265; 328/207, 328/77, 55, 63

[56] References Cited

UNITED STATES PATENTS

| | | | |
|---|---|---|---|
| 2,479,954 | 8/1949 | More | 328/55 |
| 3,040,189 | 6/1962 | Cramer | 328/207 X |
| 3,152,306 | 9/1964 | Cooper et al. | 307/265 X |
| 3,225,214 | 12/1965 | Burley | 307/293 X |
| 3,315,099 | 4/1967 | Nishioka | 307/273 |
| 3,341,788 | 9/1967 | Nishioka | 307/293 X |

*Primary Examiner*—Stanley T. Krawczewicz
*Attorney*—Warren H. Kintzinger

[57] ABSTRACT

A monostable vibrator connected in a circuit, with a constant current source producing an output which is delayed from an input pulse in time depending upon a control voltage. Variation in the control voltage linearally adjusts the time spacing between the input and output pulses.

3 Claims, 6 Drawing Figures

INVENTOR.
MICHAEL W. LUNDGREEN
BY Marvin Moody
ATTORNEY

VOLTAGE VARIABLE PULSE DELAY MONOSTABLE MULTIVIBRATOR

This invention relates in general to a unique multivibrator circuit and, in particular, to a circuit which will produce an output pulse delayed in time linearly proportional to a variable control voltage source.

The present invention relates to a circuit in which a voltage indicative of various functions can be converted into a time delayed pulse.

A feature of this invention provides a monostable multivibrator capable of being triggered by a first pulse and which has a constant current supply connected to it and produces an output pulse after the input pulse delayed by a time proportional to a control voltage.

It is an object of the present invention to provide a very accurate time delay circuit controlled by a variable voltage.

Another object of this invention is to provide an improved monostable multivibrator with a variable switching time.

A feature of this invention is found in the provision for a monostable multivibrator connected in a circuit with a constant current source and controlled by a variable voltage source so as to produce an output signal which varies in time from an input signal in accordance with the output of the control source.

Figure 1:
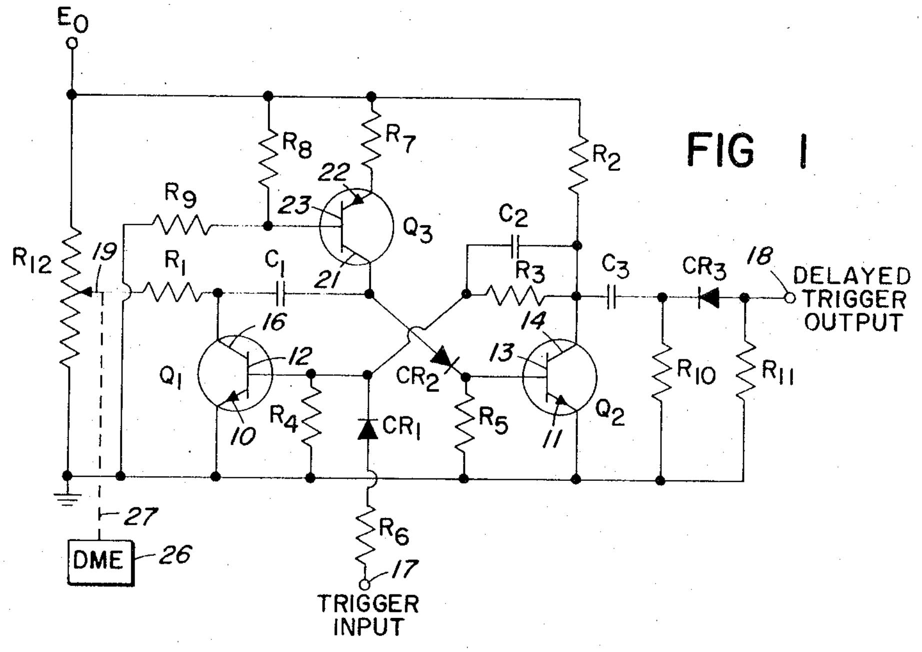

Further objects, features, and advantages of this invention will become apparent from the following description and claims when read in view of the accompanying drawings, in which:

FIG. 1 illustrates the variable delay monostable multivibrator of this invention; and, FIGS. 2*a–e* illustrate wave shapes at various points in the circuit.

FIG. 1 illustrates a monostable multivibrator comprising a pair of transistors $Q_1$ and $Q_2$. The emitters 10 and 11 of transistors $Q_1$ and $Q_2$ are connected to ground. The bases 12 and 13 of transistors $Q_1$ and $Q_2$ are connected to ground through resistors $R_4$ and $R_5$, respectively. The collector 14 of transistor $Q_2$ is connected to the base 12 of transistor $Q_1$ through resistor $R_3$ and bypass condenser $C_2$. The collector 16 of transistor $Q_1$ is connected to the base 13 of $Q_2$ through the timing capacitor $C_1$ and the diode $CR_2$.

A positive input triggering pulse is periodically connected to terminal 17 and is supplied to the base 12 of transistor $Q_1$ through resistor $R_6$ and the diode $CR_1$. A negative output pulse appears at terminal 18 which is coupled from the collector 14 of transistor $Q_2$ through the differentiating circuit comprising capacitor $C_3$ and, resistor $R_{10}$, diode $CR_3$ and resistor $R_{11}$. Diode $CR_3$ is connected in the signal path with cathode to the junction of capacitor $C_3$ and resistor $R_{10}$ and resistor $R_{11}$ is connected between the anode of diode $CR_3$ and ground. The other side of resistor $R_{10}$ is connected to ground.

A biasing source $E_0$ is connected through resistor $R_2$ to the collector 14 of transistor $Q_2$. A control potentiometer comprising resistor $R_{12}$ and contact 19 is connected from $E_0$ to ground. A resistor $R_1$ is connected to contact 19 at one end and at the other end to collector 16 of transistor $Q_1$ and to the timing condenser $C_1$.

A constant current source includes transistor $Q_3$ in its circuit environment with collector 21 connected to the junction point between the condenser $C_1$ and the diode $CR_2$, and its emitter 22 connected through resistor $R_7$ to $E_0$. The base 23 of transistor $Q_3$ is connected to the junction point between resistors $R_8$ and $R_9$. The other side of resistor $R_8$ is connected to $E_0$ and the other side of resistor $R_9$ is connected to ground. With $E_0$ substantially a constant regulated voltage supply the junction of resistors $R_8$ and $R_9$ applies a fixed voltage bias at the base 23 of transistor Q3. Further, with the base voltage held constant the voltage across resistor $R_7$ is constant and, as a result, the emitter current is constant and the collector current is maintained at a substantially constant level, approximately 98 percent of the emitter current as a constant current source for the monostable multivibrator.

A transducer or other signal source as, for example, a radio distance measuring equipment 26 has output shaft 27 which is connected to the movable contact 19 to control the time delay between the input trigger applied to terminal 17 and the output trigger appearing at terminal 18.

Basically, the circuit is a monostable multivibrator with a constant current source from transistor $Q_3$ which is used to linearly charge the timing capacitor $C_1$. In the quiescent state, transistor $Q_1$ is biased "off" and $Q_2$ is biased "on." The collector current of $Q_3$ is constant. When transistor $Q_1$ is triggered, its collector goes to ground potential thus applying a negative going step to capacitor $C_1$. The magnitude of the negative step as seen on the anode of diode $CR_2$ is equal to the quiescent voltage on the collector of transistor $Q_1$ less its saturation voltage. Before the circuit was triggered, the anode of diode $CR_2$ was slightly above ground potential. When triggered, the potential of the anode of $CR_2$ goes negative thus turning "off" transistor $Q_2$. Transistor $Q_2$ remains in the "off" state until capacitor $C_1$ is charged up to an aboveground potential by the constant current source $Q_3$. When transistor $Q_2$ turns back on, a negative trigger is produced at the output of the circuit due to the action of the differentiator. The time delay between the input trigger and the output trigger is directly proportional to the voltage on the contact 19 of the potentiometer $R_{12}$ since capacitor $C_1$ is subject to a linear charging characteristic with its constant current charging source.

This circuit can be used to replace phantastron and bootstrap sweep circuits in radar ranging circuitry and other similar applications. In one proposed DME (distance measuring equipment) application, the time delay generated by this multivibrator was plotted versus the voltage on the collector of transistor $Q_1$. The results indicated that the linearity of the multivibrator was within 0.5 percent. The linearity of the time delay sweep approaches that of the phantastron and bootstrap circuits with the advantages that the monostable multivibrator is simpler in design and more stable with temperature variations.

In an actual circuit constructed, the following component values were used:

| | |
|---|---|
| Resistors $R_1$ and $R_2$ | 22,000 ohms |
| $R_3$, $R_4$, $R_{10}$ and $R_{11}$ | 100,000 ohms |
| $R_5$ | 39,000 ohms |
| $R_6$ | 15,000 ohms |
| $R_7$ | 162,000 ohms |
| $R_8$ | 17,800 ohms |
| $R_9$ | 3,830 ohms |
| $R_{12}$ | 2,000 ohms |
| Capacitors $C_1$ | 0.02 microfarads |
| $C_2$ | 220 picofarads |
| $C_3$ | 100 picofarads |
| Transistors $Q_1$, $Q_2$ | Type 2N1711 |
| $Q_3$ | Type 2N1132 |
| Diodes $CR_1$, $CR_3$ | Type 1N3064 |
| $CR_2$ | Type 1N458 |
| $E_0$ | +20 volts |

Figure 2:
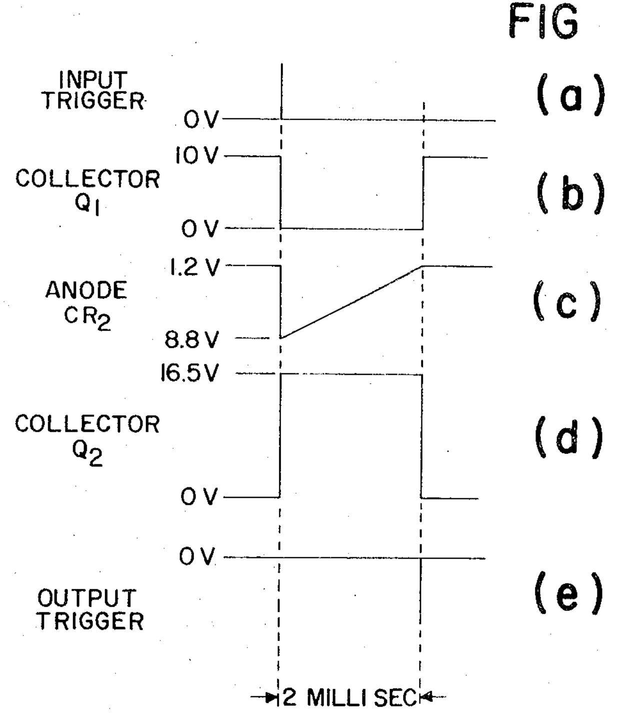

FIGS. 2*a–e* illustrate wave shapes existing at various points in the circuit. FIG. 2*a*, for example, shows the positive input signal applied to terminal 17. FIG. 2*b* illustrates the voltage on the collector 16 of transistor $Q_1$. FIG. 0*c* illustrates the voltage at the anode of diode $CR_2$. FIG. 2*d* is a plot of voltage on collector 14 of transistor $Q_2$ and FIG. 2*e* shows the output pulse appearing at terminal 18. All curves are plots of voltage against time.

It is to be realized that the setting of contact 19 controls the spacing in time between the input and output pulses. A variable voltage source of any type could replace the resistor $R_{12}$ and contact 19 to control the circuit.

It is seen that this invention provides a novel monostable multivibrator circuit and although it has been described with respect to preferred embodiments, it is not to be so limited as changes and modifications may be made as defined by the appended claims.

I claim:

1. A monostable multivibrator circuit capable of producing an output pulse delayed from an input pulse in a controlled manner comprising a monostable multivibrator, an input terminal connected to the monostable multivibrator for triggering the monostable multivibrator from its stable to its quasistable state upon a triggering signal being applied thereto, biasing circuit means for said multivibrator, said multivibrator including timing circuit means controlling the recovery time of the multivibrator, and said biasing circuit means connected to said multivibrator to vary the biasing potential on the multivibrator to control the recovery time, and a single constant current source connected to the timing circuit means of the multivibrator to provide constant current to the timing circuit with output pulse time delay a linear function of the biasing potential on the multivibrator from said biasing circuit means.

2. In apparatus according to claim 1, wherein the biasing circuit means consists of a potentiometer with a fixed biasing voltage connected thereto and has a movable contact for supplying a selectable voltage to the multivibrator.

3. In apparatus according to claim 1, wherein the multivibrator comprises a pair of transistors with their electrodes connected regeneratively and the timing circuit means includes a capacitor connected in circuit between one of the electrodes of one of the transistors and another electrode of the second transistor wherein the contact of the potentiometer is connected to the one electrode of the first transistor and to the capacitor of the timing circuit means, and an output function control means connected to the contact of the potentiometer to control its position.

* * * * *